(12) United States Patent
Arai et al.

(10) Patent No.: US 8,000,182 B2
(45) Date of Patent: Aug. 16, 2011

(54) INTEGRATED CIRCUIT FOR OPTICAL DISC

(75) Inventors: Masashi Arai, Gunma-ken (JP); Takahiro Kawashima, Ota (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 778 days.

(21) Appl. No.: 11/863,019

(22) Filed: Sep. 27, 2007

(65) Prior Publication Data
US 2008/0080331 A1    Apr. 3, 2008

(30) Foreign Application Priority Data

Sep. 29, 2006  (JP) .................................. 2006-269133

(51) Int. Cl.
*G11B 7/00* (2006.01)
(52) U.S. Cl. .................................................... 369/44.12
(58) Field of Classification Search ........................ None
See application file for complete search history.

(56) References Cited

U.S. PATENT DOCUMENTS

| | | | |
|---|---|---|---|
| 7,221,632 B2 * | 5/2007 | Worthington | 369/53.2 |
| 2003/0035352 A1 * | 2/2003 | Worthington | 369/47.35 |
| 2004/0218494 A1 * | 11/2004 | Lee et al. | 369/53.18 |
| 2005/0270919 A1 * | 12/2005 | Harada | 369/44.28 |

FOREIGN PATENT DOCUMENTS

| | | |
|---|---|---|
| JP | 10-256841 | 9/1998 |
| JP | 11-296892 | * 10/1999 |
| JP | 2001-067709 | 3/2001 |
| JP | 2002-083440 | 3/2002 |
| JP | 2005-032373 | 2/2005 |
| JP | 2007-274316 | 10/2007 |

OTHER PUBLICATIONS

Japanese Patent Office., Notification of Reasons for Rejection for Japanese Application No. 2006-269133, Mail Date Aug. 17, 2010.

* cited by examiner

*Primary Examiner* — Hoa T Nguyen
*Assistant Examiner* — Emily Frank
(74) *Attorney, Agent, or Firm* — SoCal IP Law Group LLP; Steven C. Sereboff; John E. Gunther

(57) ABSTRACT

An integrated circuit for optical disc comprising for each of light-receiving surfaces: an operational amplifier including inverting and noninverting input terminals receiving first and second input voltages, and output terminal receiving output voltage; a feedback resistor connected between the inverting input and output terminals; a photodiode connected between one power supply line of the first and second power supply lines and the inverting input terminal to generate current corresponding to reflected light; a capacitor connected between the one power supply line and the noninverting input terminal; and an input resistor connected between reference power source and the noninverting input terminal, further comprising: an adder adding voltages corresponding to the output voltages to generate RF signal, capacitance of the capacitor and resistance value of the input resistor being determined in accordance with capacitance of parasitic capacitor connected in parallel with the photodiode and resistance value of the feedback resistor.

2 Claims, 8 Drawing Sheets

INTEGRATED CIRCUIT FOR OPTICAL DISC

CROSS-REFERENCE TO RELATED APPLICATION

This application claims the benefit of priority to Japanese Patent Application No. 2006-269133, filed Sep. 29, 2006, of which full contents are incorporated herein by reference.

BACKGROUND OF THE INVENTION

1. Field of the Invention

The present invention relates to an integrated circuit for optical disc.

2. Description of the Related Art

Currently, optical disc apparatuses are widely used that generate RF (Radio Frequency) signals based on light amounts of reflected light of laser beams applied to optical discs (such as CD (Compact Disc) and DVD (Digital Versatile Disc)) to reproduce information recorded on the optical discs in accordance with the RF signals. Therefore, an optical disc apparatus may include a photodetector that receives reflected light of laser beam on a plurality of light-receiving surfaces, and an integrated circuit for optical disc that outputs RF signals based on the reflected light of laser beam received on the plurality of light-receiving surfaces. With reference to FIGS. 5 and 6, the generation of RF signals based on the reflected light of laser beam will hereinafter be described. FIG. 5 is a diagram of light-receiving surfaces A to D that substantially evenly receive the reflected light of laser beam in a photodetector 100, when the laser beam is focused on a track spirally formed in an information recording layer of the optical disc. FIG. 6 is a circuit diagram of a configuration of an integrated circuit for optical disc 101.

The reflected light of laser beam received by the light-receiving surface A of the photodetector 100 is converted into a current in accordance with a light amount of the reflected light by a photodiode 102 of the integrated circuit for optical disc 101. A first operational amplifier 103 converts the current generated by the photodiode 102 into a voltage in combination with a feedback resistor 104 and outputs to a second operational amplifier 105 the output voltage amplified with a gain determined by a resistance value of the feedback resistor 104. The second operational amplifier 105 amplifies the output voltage of the first operational amplifier 103 at a predetermined amplification rate and outputs an output voltage (hereinafter, photoelectric conversion signal A) acquired as a result of the amplification to an adder 107 through a resistor 106A and an external processing circuit of the integrated circuit for optical disc 101. A capacitor 120 shown in FIG. 6 equivalently indicates a parasitic capacitor generated on a signal line for transmitting the photoelectric conversion signal A output from the integrated circuit for optical disc 101 to the external processing circuit through a flexible substrate. The integrated circuit for optical disc 101 has the same configuration (not shown) as the photodiode 102, the first operational amplifier 103, the feedback resistor 104, and the second operational amplifier 105 described above between a Vcc line and a GND line for each of the light-receiving surfaces B to D. As a result, the adder 107 receives input of the photoelectric conversion signals A to D corresponding to light amounts of the reflected light of laser beam received by the light-receiving surfaces A to D, via resistors A to D. The adder 107 outputs an RF signal acquired as a result of adding the photoelectric conversion signals A to D to the inverting input terminal of a third operational amplifier 108. The third operational amplifier 108 amplifies the RF signal applied to the inverting input terminal with a gain determined by a feedback resistor 111 and an input resistor 110 and outputs the signal to the external processing circuit. A capacitor 121 shown in FIG. 6 equivalently indicates a parasitic capacitor generated on a signal line for transmitting a signal corresponding to the RF signal, which signal is output by the integrated circuit for optical disc 101, to the external processing circuit through the flexible substrate. As a result, the RF signal smoothed by the capacitor 121 is input to the output processing circuit through the flexible substrate, and information is reproduced based on the RF signal (see Japanese Patent Application Laid-Open Publication No. 2005-32373).

However, in the above integrated circuit for optical disc 101, the output RF signal may have characteristics shown in FIG. 7B, which is different from ideal characteristics shown in FIG. 7A. This is because, for example, when only the light-receiving surface A of the photodetector 100 is driven to receive the reflected light of laser beam, the photoelectric conversion signals B to D shown in FIG. 8 are generated which have phase speeds faster than that of the photoelectric conversion signal A although only the photoelectric conversion signal A shown in FIG. 8 should normally be generated, and the phase of the photoelectric conversion signals B to D becomes substantially reverse to the phase of the photoelectric conversion signal A in a certain frequency band f (e.g., frequency band around 40 MHz) and thereby the photoelectric conversion signal A is reduced. The photoelectric conversion signals B to D are generated in such a case that a power supply line connected to the photodiode 102 is fluctuated and that the reflected light of laser beam to be received by one light-receiving surface is leaked to other light-receiving surfaces. With reference to FIG. 6, detailed description will hereinafter be made of one cause of the fluctuations of the power supply line, which generate the photoelectric conversion signals B to D when only the light-receiving surface A is driven to receive the reflected light of laser beam.

The Vcc and GND lines connecting the integrated circuit for optical disc 101 and the flexible substrate are configured with wires, etc., and include inductor components corresponding to lengths, etc., of the wires (inductors 122 and 123 of FIG. 6 equivalently indicates the inductor components). Therefore, if the capacitor 121 is charged in accordance with the RF signal, a current ia is supplied from the Vcc line, and the Vcc line is fluctuated when the current ia is supplied to the inductor 122. If the capacitor 121 is discharged in accordance with the RF signal, a current ic is supplied from the capacitor 121 to the GND line, and the GND line is fluctuated when the current ic is supplied to the inductor 123. The fluctuations of the power supply line (the GND line of FIG. 6) connected to the photodiode 102 for the light-receiving surfaces A to D are propagated to the first operational amplifier 103 and the second operational amplifier 105 through parasitic capacitance (hereinafter, parasitic capacitor 109) of the photodiode 102, which is connected in parallel with the photodiode 102, and the photoelectric conversion signals B to D shown in FIG. 8 are generated. The fluctuations of the GND line may be generated not only as described above but also due to external factors such as overlapping of noise components. The level of the photoelectric conversion signal A may be reduced by the photoelectric conversion signals B to D having a reversed phase of the photoelectric conversion signal A in a certain frequency band f, and the RF signal with the waveform shown in FIG. 7B may be generated as described above. If information is reproduced based on this RF signal in the subsequent processing circuit, the information may inaccurately be reproduced or the reproduction of the information may become impossible.

SUMMARY OF THE INVENTION

An integrated circuit for optical disc according to an aspect of the present invention, outputting an RF (Radio Frequency) signal for reproducing information recorded on an optical disc, based on reflected light of a laser beam applied to the optical disc, the reflected light being received by a plurality of light-receiving surfaces of a photodetector, comprises, between a first power supply line and a second power supply line whose voltage is lower than that of the first power supply line, for each of the plurality of light-receiving surfaces: an operational amplifier including a positive power supply terminal connected to the first power supply line, a negative power supply terminal connected to the second power supply line, an inverting input terminal for receiving application of a first input voltage, a noninverting input terminal for receiving application of a second input voltage, and an output terminal for outputting an output voltage; a feedback resistor connected between the inverting input terminal and the output terminal; a photodiode connected between one power supply line of the first power supply line and the second power supply line and the inverting input terminal, to generate a current corresponding to the reflected light of the laser beam; a capacitor connected between the one power supply line and the noninverting input terminal; and an input resistor connected between a reference power source and the noninverting input terminal, the integrated circuit further comprising: an adder adding voltages corresponding to the output voltages of the operational amplifiers of the respective light-receiving surfaces, to generate the RF signal, a capacitance of the capacitor and a resistance value of the input resistor being determined in accordance with a capacitance of a parasitic capacitor connected in parallel with the photodiode and with a resistance value of the feedback resistor so as to at least alleviate an effect of fluctuations of the one power supply line on the RF signal.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

==Overall Configuration of Optical Disc Apparatus 21 Including Integrated Circuit for Optical Disc 1==

Figure 2:
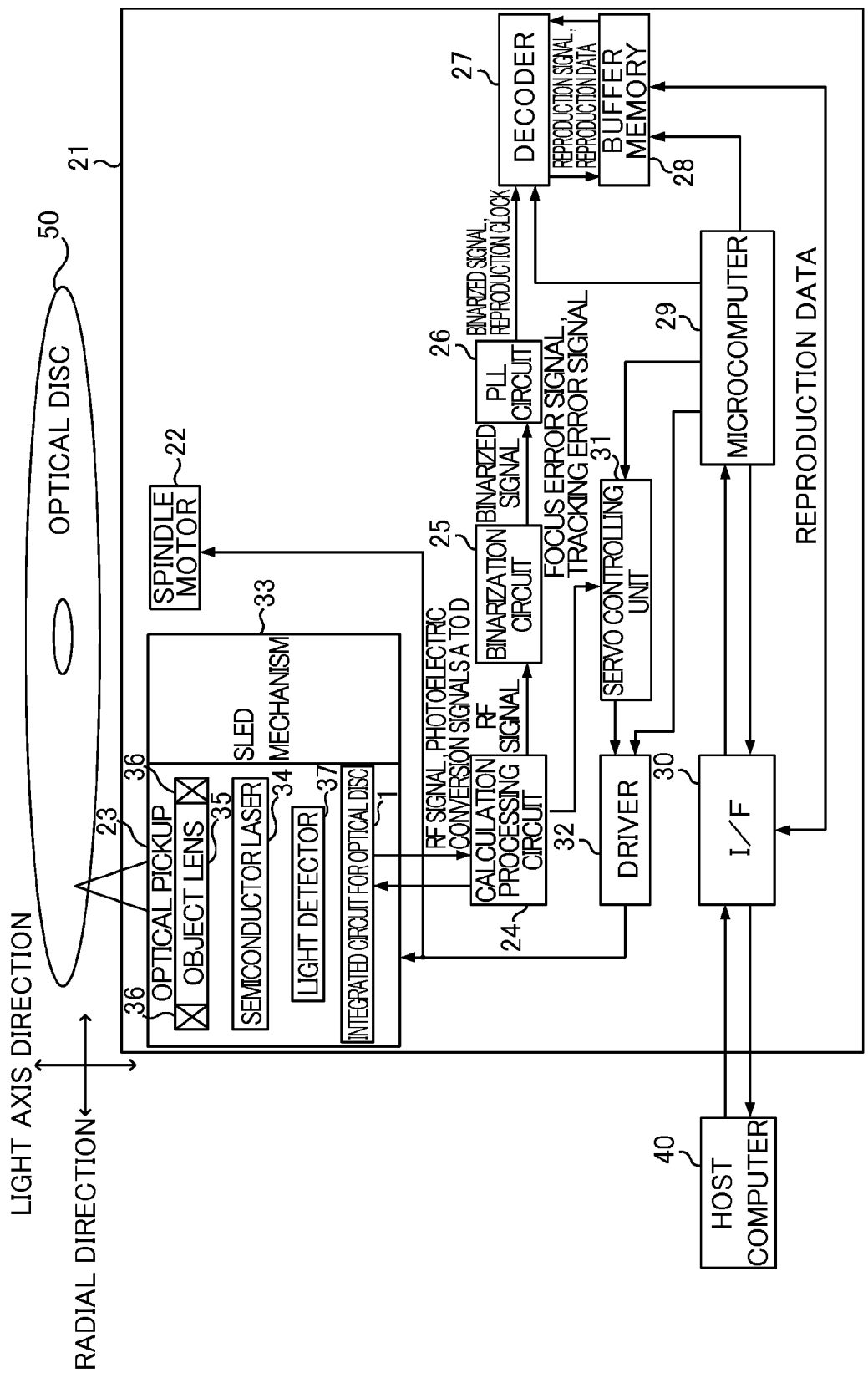
FIG. 2 is a diagram of an overall configuration of an optical disc apparatus including the integrated circuit for optical disc according to one embodiment of the present invention.

An overall configuration of an optical disc apparatus 21 including an integrated circuit for optical disc 1 according to an embodiment of the present invention will hereinafter be described with reference to FIG. 2 and to FIG. 5 as needed. FIG. 2 is a block diagram of an example of an overall configuration of an optical disc apparatus 21 including the integrated circuit for optical disc 1 according to an embodiment of the present invention. Although an optical disc 50 is a optical disc of the CD standard in the description of the embodiment, the integrated circuit for optical disc 1 is applicable to optical discs of other standards (such as the DVD standard and the Blu-ray Disc (registered trademark) standard).

The optical disc apparatus 21 includes a spindle motor 22, an optical pickup 23, an calculation processing circuit 24, a binarization circuit 25, a PLL (Phase Locked Loop) circuit 26, a decoder 27, a buffer memory 28, a microcomputer 29, an interface (I/F) 30, a servo controlling portion 31, a driver 32, and a sled mechanism 33. Although the optical disc apparatus 21 of the embodiment only includes a configuration capable of reproducing information recorded on the optical disc 50, this is not a limitation, and a configuration capable of recording information on the optical disc 50 may be added thereto.

When a spindle control voltage from the driver 32 is applied to a spindle motor coil (not shown), the spindle motor 22 is rotated at a rotation speed corresponding to the control voltage to rotate the optical disc 50 disposed on a chucking mechanism (not shown) in a predetermined rotation direction.

The sled mechanism 33 includes a main shaft not shown supporting the optical pickup 23, a sled motor, a transmission gear, etc. When a sled control voltage from the driver is applied to the sled motor, the sled mechanism 33 moves the optical pickup 23 in a radial direction of the optical disc 50.

The optical pickup 23 includes a semiconductor laser 34, an object lens 35, an actuator 36, a photodetector 37, and an integrated circuit for optical disc 1. The optical pickup 23 is connected to the calculation processing circuit 24 and the driver 32 of the optical disc apparatus 21 through a flexible substrate not shown. In the optical pickup 23 of the embodiment, other various optical systems (collimator lens, polarizing beam splitter), front monitor diode, etc., included in typical optical pickups are not relate to the gist of the present invention and will not be described.

The semiconductor laser 34 is constituted by a diode formed by the PN junction of P and N semiconductors. With the application of a control voltage from the driver 32, the semiconductor laser 34 emits a laser beam having a wavelength (780 nm to 790 nm) corresponding to the specification of the optical disc 50 and a light intensity that enables reproduction of information recorded on the optical disc 50.

The object lens 35 has a numerical aperture (0.45 to 0.50) corresponding to the specification of the optical disc 50 and is held by a holder (not shown) including coils for the track servo and focus servo. The object lens 35 condenses a laser beam transmitted through and (or) reflected by various optical systems on a track spirally formed in an information recording layer of the optical disc 50. The object lens 35 converts the reflected light of the laser beam applied to the track of the optical disc 50 into substantially parallel light, which is emitted to various optical systems.

The actuator 36 is configured with magnetic members (magnet, yoke, etc.) for the track servo and focus servo, a suspension wire with one end fixed to a holder that holds the object lens 35, etc. The actuator 36 moves the object lens 35 in the light axis direction with the magnetic action of the magnetic members for the focus servo and the coil for the focus servo, which is generated by applying a focus servo control voltage from the driver 32. With such focus servo control, the laser beam from the object lens 35 is focused on the information recording layer of the optical disc 50. The actuator 36 moves the object lens 35 in the radial direction of the optical disc 50 with the magnetic action of the magnetic members for the track servo and the coil for the track servo, which is generated by applying a track servo control voltage from the driver 32. With such track servo control and the sled control of the sled mechanism 33, the laser beam from the object lens 35 follows the track of the optical disc 50.

Figure 5:
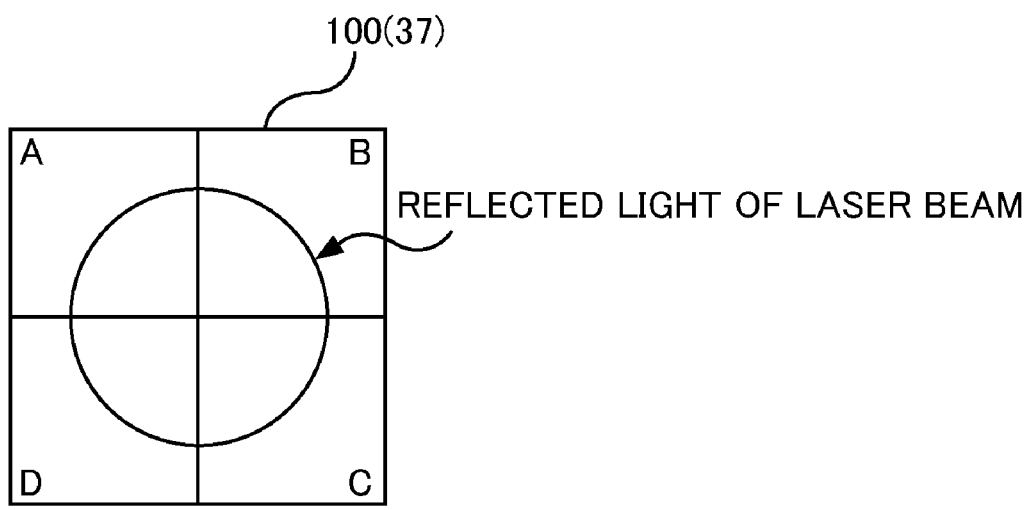
FIG. 5 is a diagram of light-receiving surfaces A to D of the photodetector and the reflected light of laser beam.
Figure 6:
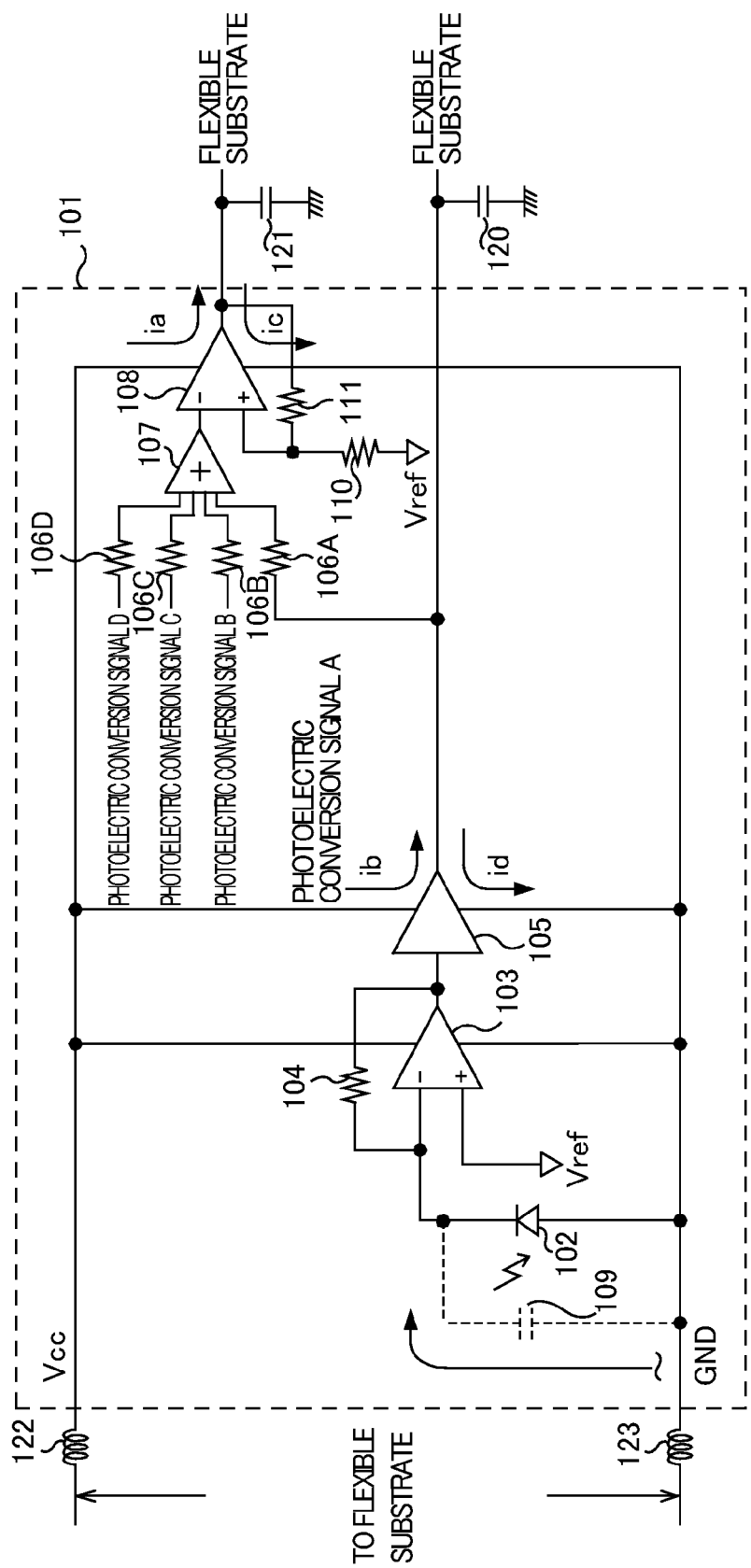
FIG. 6 is a circuit diagram of an overall configuration of an integrated circuit for optical disc.

The photodetector 37 includes, for example, four light-receiving surfaces A to D (a plurality of light-receiving surfaces) shown in FIG. 5 for receiving the reflected light of laser beam through various optical systems. Although the photodetector 37 includes only the four light-receiving surfaces A to D in the description of the embodiment assuming that the laser beam emitted by the semiconductor laser 34 is not diffracted by a diffraction grating not shown, etc., this is not a limitation. For example, if a laser beam emitted by the semiconductor laser 34 is diffracted by a diffraction grating to perform the focus control in accordance with a differential astigmatism method and/or the tracking control in accordance with a differential push-pull method, light-receiving surfaces may be provided to receive reflected light of ±first-order diffracted light generated along with zero-order light.

The integrated circuit for optical disc 1 generates photoelectric conversion signals A to D (voltages corresponding to output voltages) corresponding to the light amounts of the reflected light of laser beam received in the light-receiving surfaces A to D of the photodetector 37 and outputs the signals to the calculation processing circuit 24 through the flexible substrate. The integrated circuit for optical disc 1 generates the RF signal based on the photoelectric conversion signals A to D and outputs the RF signal to the calculation processing circuit 24 through the flexible substrate. The detailed configuration of the integrated circuit for optical disc 1 will be described later. If the laser beam from the object lens 35 is focused on and driven to follow the track of the optical disc 50, the photodetector 37 receives uniform light amounts of the reflected light of the laser beam in the four light-receiving surfaces A to D. Therefore, the photoelectric conversion signals A to D output by the integrated circuit for optical disc 1 are signals indicating the same value. Since the optical pickup 23 and the calculation processing circuit 24 are connected through the flexible substrate, signals can favorably be transmitted and received if the optical pickup 23 moves in the radial direction as above.

The calculation processing circuit 24 outputs the RF signal from the integrated circuit for optical disc 1 to the binarization circuit 25. The optical disc apparatus 21 may be configured such that the RF signal from the integrated circuit for optical disc 1 is directly output to the binarization circuit 25. The calculation processing circuit 24 amplifies, for example, the photoelectric conversion signals A to D with a predetermined gain and executes a calculation process for the focus servo control (e.g., photoelectric conversion signal A+photoelectric conversion signal C−photoelectric conversion signal B−photoelectric conversion signal D) to output a focus error signal acquired as a result of the calculation process to the servo controlling unit 31. The calculation processing circuit 24 amplifies, for example, the photoelectric conversion signals A to D with a predetermined gain and executes a calculation process for the track servo control (e.g., photoelectric conversion signal A+photoelectric conversion signal B−photoelectric conversion signal C−photoelectric conversion signal D) to output a tracking error signal acquired as a result of the calculation process to the servo controlling unit 31.

The binarization circuit 25 is configured with, for example, a comparison circuit and an integration circuit not shown, and the output of the comparison circuit is integrated by the integration circuit and input to one input of the comparison circuit to perform feedback control of a slice level. The binarization circuit 25 uses the slice level to execute a binarization process of the RF signal input to the other input of the comparison circuit and outputs to the PLL circuit 26 a binarized signal acquired as a result of the binarization process.

The PLL circuit 26 is configured with, for example, a phase comparison circuit, a frequency dividing circuit, a charge pump circuit, a low-pass filter, a VCO (Voltage Controlled Oscillator) circuit, etc., not shown. The PLL circuit 26 performs phase comparison of the binarized signal and a clock of a predetermined frequency to generate a clock (hereinafter, reproduction clock) having a phase synchronized with the binarized signal and outputs the clock to the decoder 27 along with the binarized signal.

The decoder 27 detects a level of the binarized signal at, for example, the rising edge of the reproduction clock based on the control signal from the microcomputer 29 to generate a reproduction signal recorded on the track of the optical disc 50 and to store the generated reproduction signal into the buffer memory 28. The decoder 27 reads the reproduction signal stored in the buffer memory 28 based on the control signal from the microcomputer 29 and executes decode processes such as a demodulation process (EFM (Eight Fourteen Modulation)) and an error correction process (CIRC (Cross Interleaved Reed-Solomon Code)) corresponding to the specification of the optical disc 50 to store the reproduction data acquired as a result of the decode processes into the buffer memory 28 again.

The buffer memory 28 stores the reproduction signal and the reproduction data from the decoder 27 based on the control signal from the microcomputer 29. The reproduction data stored in the buffer memory 28 are transmitted to a host computer 40 to reproduce the information with the host computer 40 based on the reproduction data.

The servo controlling unit 31 generates a focus control signal for the focus servo control based on the focus error signal from the calculation processing circuit 24 and outputs the focus control signal to the driver 32. The servo controlling unit 31 generates a track control signal for the track servo control based on the tracking error signal from the calculation processing circuit 24 and outputs the track control signal to the driver 32.

The driver 32 generates a focus servo control voltage based on the focus control signal from the servo controlling unit 31 and outputs the voltage to the actuator 36. The driver 32 generates a sled control voltage based on the control signal for the sled control from the microcomputer 29 and outputs the voltage to the sled mechanism 33. The driver 32 generates a track control voltage based on the track control signal from the servo controlling unit 31 and outputs the voltage to the actuator 36. The driver 32 generates a control voltage based on the control signal from the microcomputer 29 for controlling the rotation speed of the spindle motor 22 and outputs the voltage to the spindle motor 22. The driver 32 generates a control voltage based on the control signal from the microcomputer 29 for controlling a light amount of the laser beam to a light amount enabling the reproduction and outputs the voltage to the semiconductor laser 34.

The interface 30 is disposed for performing data transmission and reception between the host computer 40 connected through a connection terminal (not shown) and the optical disk apparatus 21. The interface 30 includes the ATAPI (AT Attachment Packet Interface) standard, the SCSI (Small Computer System Interface) standard, the IEEE (Institute of Electrical and Electronic Engineers) 1394 standard, the USB (Universal Serial Bus) standard, etc.

The microcomputer 29 is configured with CPU (Central Processing Unit), ROM (Read Only Memory), interface, etc., not shown, and generally controls the optical disc apparatus 21, through the transmission of each control signal mentioned above, based on program data stored in the ROM in advance.

The above configuration of the optical disc apparatus 21 can be converted into an integrated circuit except the optical pickup 23 and the spindle motor 22.

==Configuration of Integrated Circuit for Optical Disc 1==

Figure 1:
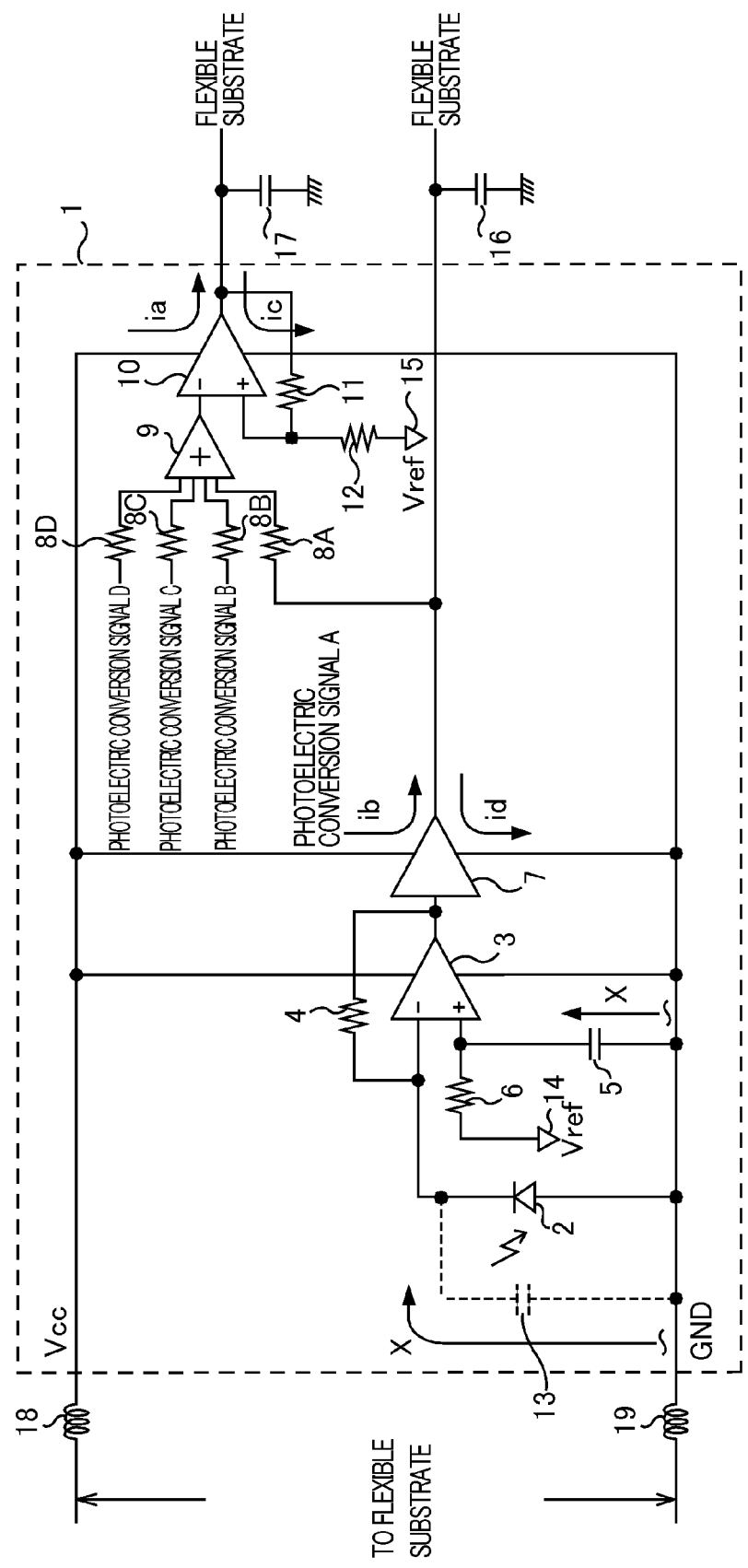
FIG. 1 is a circuit diagram of an overall configuration of an integrated circuit for optical disc according to one embodiment of the present invention.

A configuration of the integrated circuit for optical disc 1 will hereinafter be described with reference to FIG. 1 and to FIG. 2 and FIG. 5 as needed. FIG. 1 is a circuit diagram of an example of an overall configuration of the integrated circuit for optical disc 1. In the description of the embodiment, it is assumed that a Vcc line (first power supply line) and a GND line (second power supply line, one power supply line) include inductor components corresponding to a length of wires, etc., connecting the integrated circuit for optical disc 1 to the flexible substrate. Inductors 18 and 19 shown in FIG. 1 equivalently indicate the inductor components related to the Vcc line and the GND line.

The integrated circuit for optical disc 1 includes, between the Vcc line and the GND line: a photodiode 2, a parasitic capacitor 13, a first operational amplifier 3 (operational amplifier), a feedback resistor 4, reference power sources 14, 15, an input resistor 6, a capacitor 5, a second operational amplifier 7, resistors 8A to 8D, a third operational amplifier 10, a feedback resistor 11, and an input resistor 12.

The photodiode 2 is connected to the GND line at the anode and is connected to the inverting input terminal of the first operational amplifier 3 at the cathode. The photodiode 2 generates a current corresponding to a light amount of the reflected light of laser beam received by the light-receiving surface A of the photodetector 37.

The parasitic capacitor 13 is parasitic capacitance of the photodiode 2, which is connected in parallel with and parasitic on the photodiode 2 between the GND line and the inverting input terminal of the first operational amplifier 3 by the integration of the integrated circuit for optical disc 1. The capacitance of the parasitic capacitor 13 corresponds to a value of a reference voltage Vref of the reference power source 14 described later.

The feedback resistor 4 is connected between the inverting input terminal and the output terminal of the first operational amplifier 3. A first input voltage is generated by supplying a current from the photodiode 2 to the feedback resistor 4 and is applied to the inverting input terminal of the first operational amplifier 3.

The input resistor 6 is connected between the reference power source 14 and the noninverting input terminal of the first operational amplifier 3. A second input voltage is determined by a resistance value of the input resistor 6 and the reference voltage Vref of a predetermined value of the reference power sources 14 and is applied to the noninverting input terminal of the first operational amplifier 3.

The capacitor 5 is connected between the GND line connected with the photodiode 2 and the parasitic capacitor 13 and the noninverting input terminal of the first operational amplifier 3.

The above resistance value of the input resistor 6 and the capacitance of the capacitor 5 are determined to a value satisfying (resistance value of the input resistor 6/resistance value of the feedback resistor 4)=(capacitance of the parasitic capacitor 13/capacitance of the capacitor 5) to at least alleviate the effect of fluctuations of the GND line on the RF signal. Therefore, in the description of the embodiment, it is assumed that the resistance value of the input resistor 6 is substantially identical to the resistance value of the feedback resistor 4, for example, and that the capacitance of the capacitor 5 is substantially identical to the capacitance of the parasitic capacitor 13, for example.

The first operational amplifier 3 is connected to the Vcc line at the positive power supply terminal, to the GND line at the negative power supply terminal, and to the second operational amplifier 7 at the output terminal. The first operational amplifier 3 converts a current generated by the photodiode 2 into a voltage in combination with a feedback resistor 4, amplifies the voltage with a gain determined by a resistance value of the feedback resistor 4, and outputs the amplification result, i.e., an output voltage to the second operational amplifier 7.

The second operational amplifier 7 is connected to the Vcc line at the positive power supply terminal, to the GND line at the negative power supply terminal, and to the resistor 8A and the flexible substrate at the output terminal. The second operational amplifier 7 outputs to the resistor 8A and the flexible substrate the photoelectric conversion signal A, which is formed by amplifying the output voltage of the first operational amplifier 3 with a predetermined gain. The capacitor 16 shown in FIG. 1 equivalently indicates a parasitic capacitor generated on a signal line for transmitting the photoelectric conversion signal A output from the second operational amplifier 7 to the calculation processing circuit 24, etc., through the flexible substrate. The predetermined gain of the second operational amplifier 7 can be varied to accommodate a medium type (such as CD-R (Recordable)/RW (ReWritable)) of the optical disc 50, for example.

The photoelectric conversion signal A output to the flexible substrate is smoothed by the capacitor 16, and the direct-current component of the photoelectric conversion signal A is output to the calculation processing circuit 24 through the flexible substrate. If the capacitor 16 is charged in accordance with the alternating-current component of the photoelectric conversion signal A, a current ib is supplied to the capacitor 16 through the Vcc line, the positive power supply terminal and the output terminal of the second operational amplifier 7, and the Vcc line is fluctuated when this current ib is supplied to the inductor 18. If the capacitor 16 is discharged in accordance with the alternating-current component of the photoelectric conversion signal A, a current id is supplied to the GND line through the output terminal and the negative power supply terminal of the second operational amplifier 7, and the GND line is fluctuated when this current id is supplied to the inductor 19. The Vcc line and the GND line are also fluctuated due to external factors such as overlapping of noise components.

Although not shown in this embodiment, the integrated circuit for optical disc 1 has the same configuration as the photodiode 2, the parasitic capacitor 13, the feedback resistor 4, the input resistor 6, the capacitor 5, the first operational amplifier 3, and the second operational amplifier 7 described above for each of the light-receiving surfaces B to D. Therefore, the photoelectric conversion signals A to D are input to an adder 9 through resistors 8A to 8D.

The adder 9 adds the photoelectric conversion signals A to D and outputs the RF signal (=photoelectric conversion signal A+photoelectric conversion signal B+photoelectric conversion signal C+photoelectric conversion signal D) obtained as a result of the addition to the inverting input terminal of the third operational amplifier 10.

The feedback resistor 11 is connected between the noninverting input terminal and the output terminal of the third operational amplifier 10.

The input resistor 12 is connected between the reference power supply 15 and the noninverting input terminal of the third operational amplifier 10.

The third operational amplifier 10 is connected to the Vcc line at the positive power supply terminal, to the GND line at the negative power supply terminal, and to the flexible substrate at the output terminal. The third operational amplifier 10 receives at the noninverting input terminal the application of the second input voltage acquired by dividing a difference voltage between the reference voltage Vref of the reference power source 15 and the output voltage by a resistance value of the input resistor 12 and a resistance value of the feedback resistor 11. The third operational amplifier 10 amplifies the RF signal applied to the inverting input terminal in accordance with the second input voltage applied to the noninverting input terminal and outputs the signal to the flexible substrate. The capacitor 17 shown in FIG. 1 equivalently indicates a parasitic capacitor generated on a signal line for transmitting the RF signal output from the third operational amplifier 10 to the calculation processing circuit 24, etc., through the flexible substrate.

The RF signal from the third operational amplifier 10 is smoothed by the capacitor 17, and the direct-current component of the RF signal is output to the calculation processing circuit 24 through the flexible substrate. If the capacitor 17 is charged in accordance with the alternating-current component of the RF signal, a current ia is supplied to the capacitor 17 through the Vcc line, the positive power supply terminal and the output terminal of the third operational amplifier 10, and the Vcc line is fluctuated when this current ia is supplied to the inductor 18. If the capacitor 17 is discharged in accordance with the alternating-current component of the RF signal, a current ic is supplied to the GND line through the output terminal and the negative power supply terminal of the third operational amplifier 10, and a fluctuation of the GND line (hereinafter, GND-line fluctuation X) is generated when this current ic is supplied to the inductor 19. The Vcc line and the GND line are also fluctuated due to external factors such as overlapping of noise components.

==Operation of Integrated Circuit for Optical Disc 1 for GND-Line Fluctuation==

Figure 3:
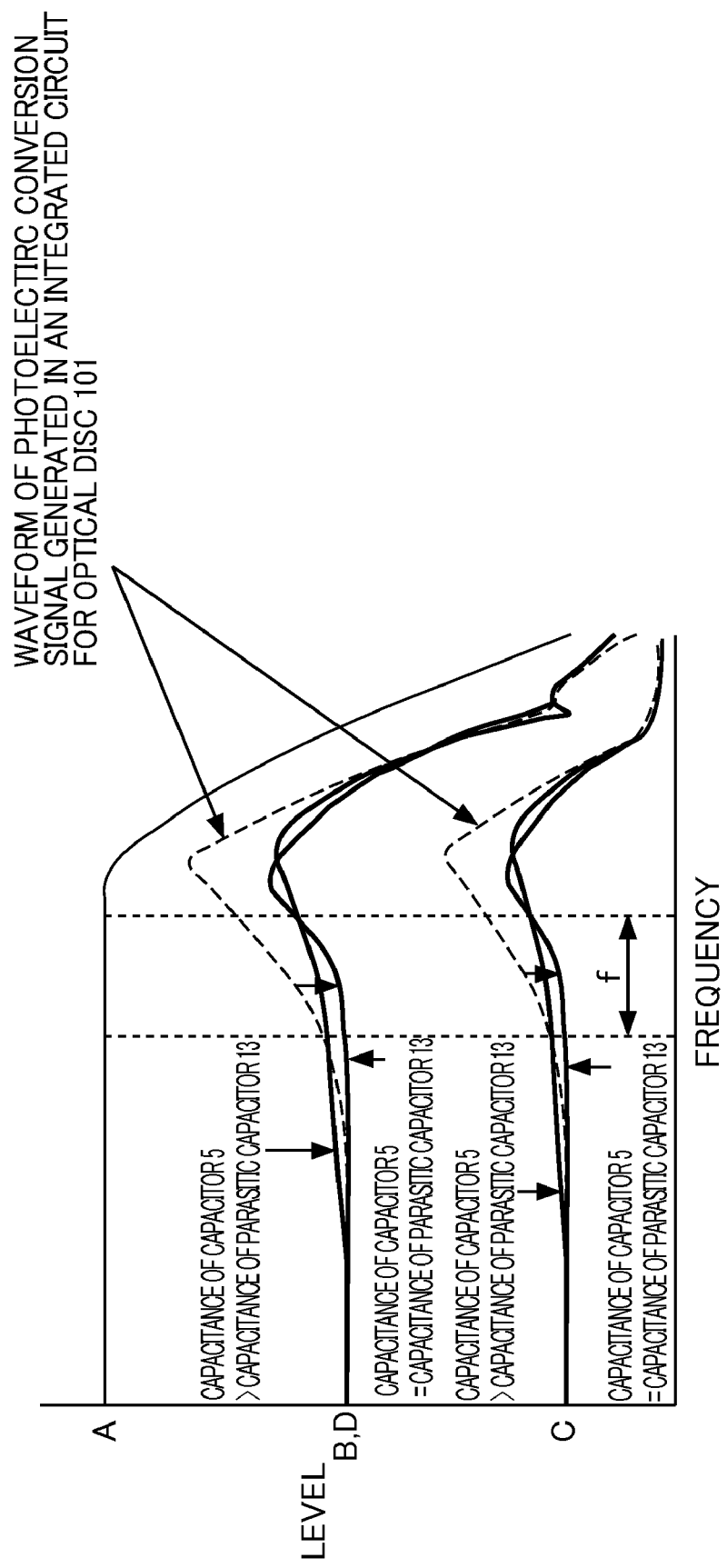
FIG. 3 is a diagram of photoelectric conversion signals A to D generated when only a light-receiving surface A of a photodetector is driven to receive reflected light of laser beam.
Figure 4:
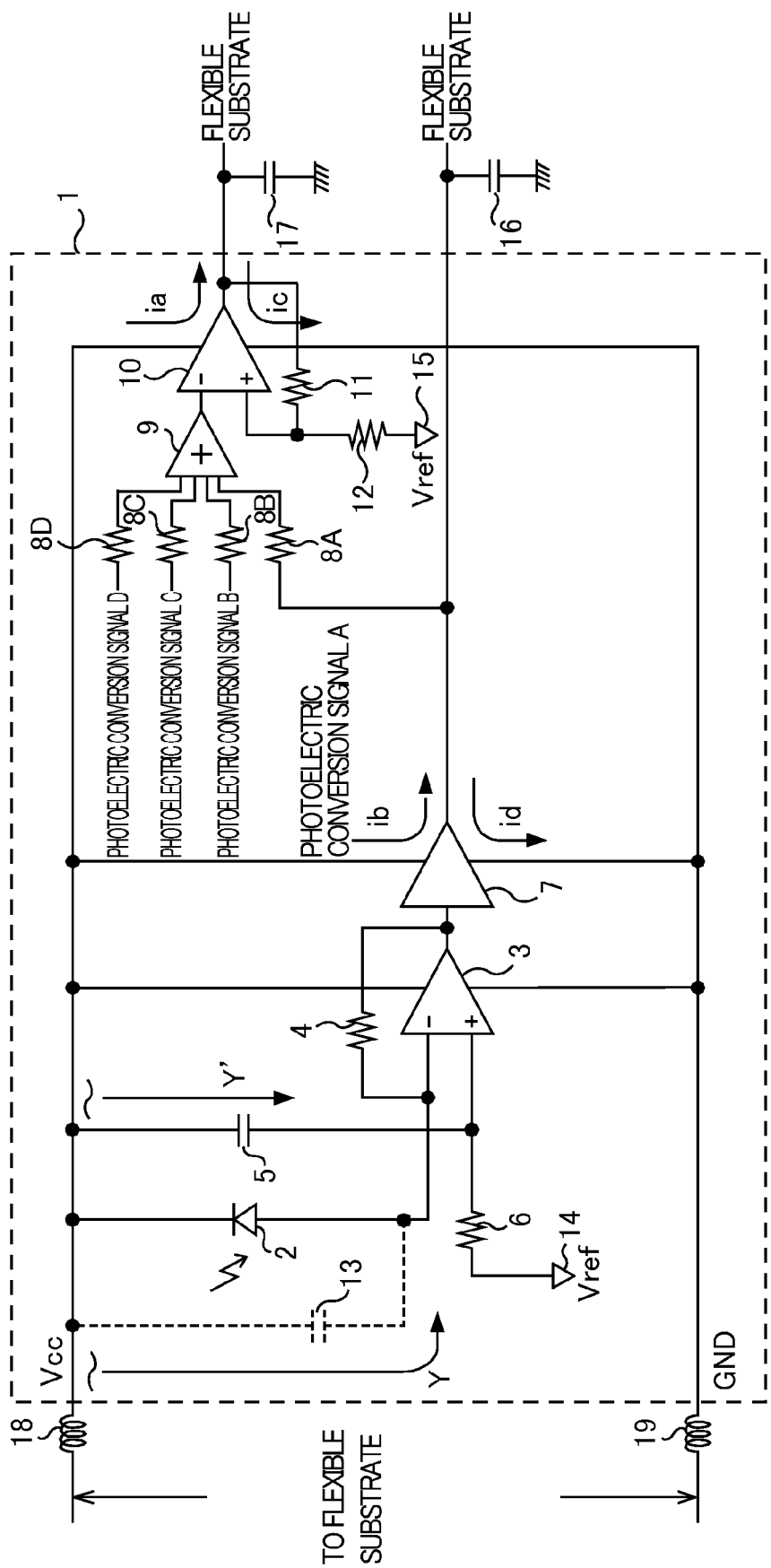
FIG. 4 is a circuit diagram of another form of an overall configuration of the integrated circuit for optical disc according to one embodiment of the present invention.
Figure 7A:
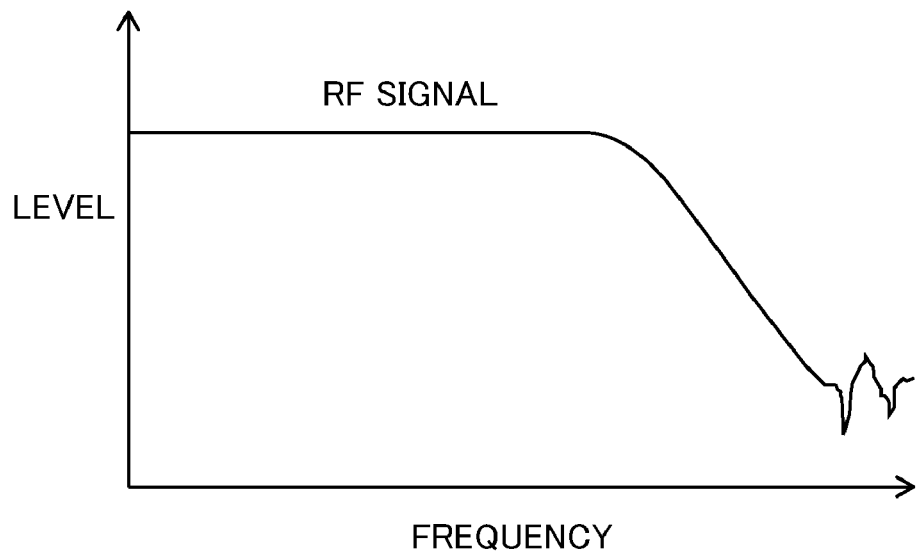
FIG. 7A is a diagram of characteristics of an ideal RF signal.
Figure 7B:
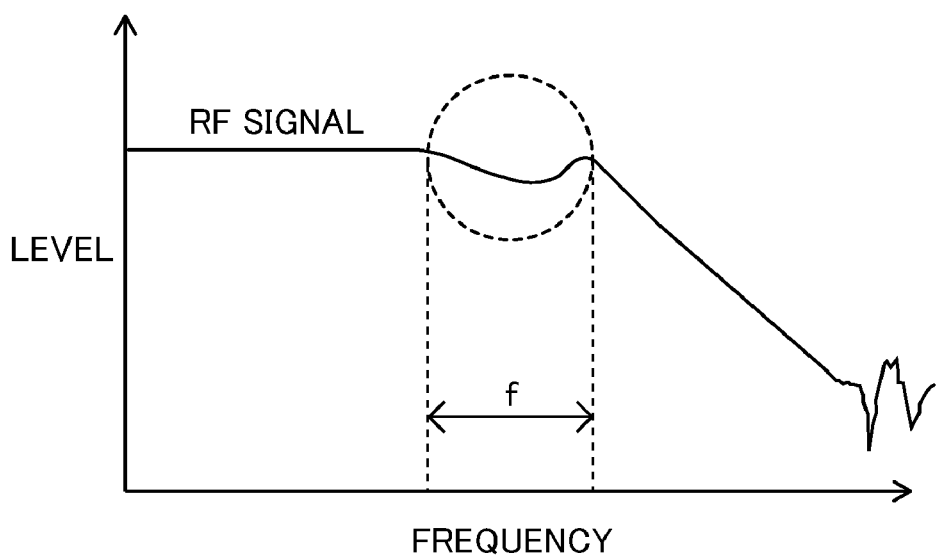
FIG. 7B is a diagram of characteristics of an actual RF signal.
Figure 8:
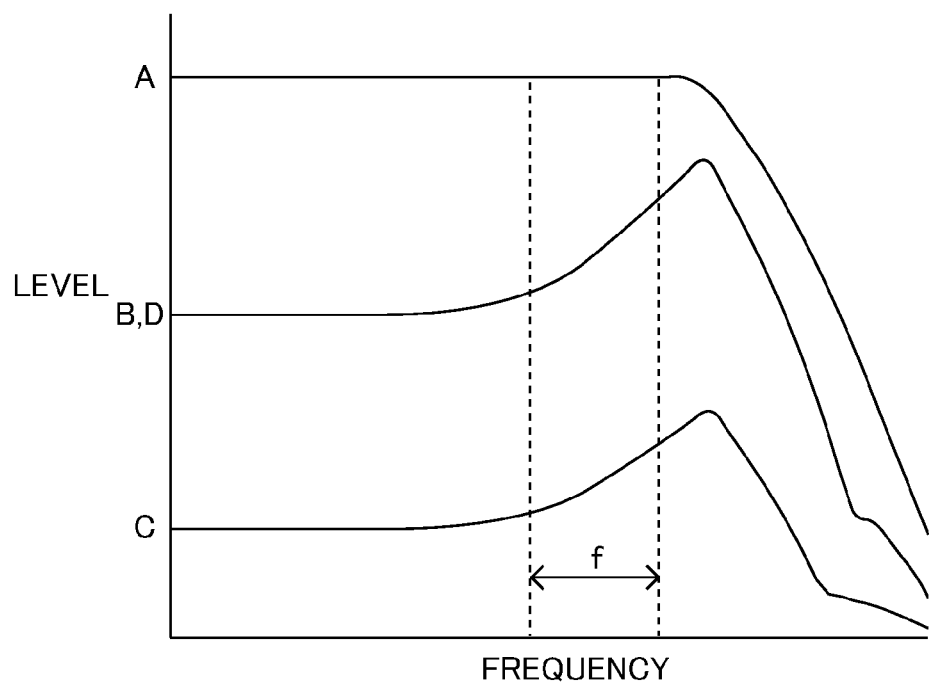
FIG. 8 is a diagram of photoelectric conversion signals A to D generated when only a light-receiving surface A of a photodetector is driven to receive reflected light of laser beam.

The operation of the integrated circuit for optical disc 1 for the GND-line fluctuation will hereinafter be described with reference to FIGS. 1 and 7A and 7B and to FIGS. 3 and 4 as needed. FIG. 3 is a diagram of the photoelectric conversion signals A to D generated when only the light-receiving surface A of the photodetector 37 is driven to receive the reflected light of laser beam. FIG. 4 is a circuit diagram of another overall configuration of the integrated circuit for optical disc 1. The operation of the integrated circuit for optical disc 1 for the GND-line fluctuation described in the embodiment is, by way of example, the operation in the case of driving only the light-receiving surface A of the photodetector 37 to receive the reflected light of laser beam.

As described above, if the capacitor 17 is discharged in accordance with the alternating-current component of the RF signal, the current ic is supplied to the inductor 19 and the GND line is fluctuated. Alternately (additionally), if the capacitor 16 is discharged in accordance with the alternating-current component of the photoelectric conversion signal A, the alternating-current signal id is supplied to the inductor 19 and the GND line is fluctuated. The GND line is also fluctuated due to external factors such as overlapping of noise components. The alternating-current component of the GND-line fluctuation X is supplied to the feedback resistor 4 through the parasitic capacitor 13 of each of the light-receiving surfaces A to D. Therefore, the inverting input terminal of the first operational amplifier 3 receives the application of the first input voltage determined by a product of the alternating-current component of the GND-line fluctuation X and a resistance value of the feedback resistor 4.

The alternating-current component of the GND-line fluctuation X is supplied to the noninverting input terminal of the input resistor 6 through the capacitor 5 that is connected to the GND line along with the photodiode 2 and the parasitic capacitor 13 and has substantially the same capacitance as that of the parasitic capacitor 13. Therefore, the noninverting input terminal of the first operational amplifier 3 receives the application of the second input voltage determined by a product of the alternating-current component of the GND-line fluctuation X and a resistance value of the input resistor 6. That is, the first input voltage and the second input voltage of substantially the same level are applied to the inverting input terminal and the noninverting input terminal of the first operational amplifier 3.

As a result, in the first operational amplifier 3, the first input voltage applied to the inverting input terminal is at least alleviated by the second input voltage applied to the noninverting input terminal. Therefore, as shown in FIG. 3, with regard to the photoelectric conversion signals B to D that should not be generated in a normal situation, the waveforms are changed from waveforms shown by dash lines (waveforms of the photoelectric conversion signals B to D generated in an integrated circuit for optical disc 101) to waveforms having lower levels shown by solid lines. As a result, if the photoelectric conversion signal A and the photoelectric conversion signals B to D are added by the adder 9 to generate the RF signal, the canceled amount of the photoelectric conversion signal A is reduced as compared to that in the conventional case since the levels of the photoelectric conversion signals B to D are lowered in the frequency band f (e.g., frequency band around 40 MHz) where the phase of the photoelectric conversion signal A becomes the reversed phase of the photoelectric conversion signals B to D. That is, the effect of the GND-line fluctuation X is at least alleviated in the RF signal. Therefore, the adder 9 outputs the RF signal closer (or identical) to the ideal RF signal shown in FIG. 7A. Information is more favorably reproduced as compared to that in the conventional case by performing a reproduction process in the calculation processing circuit 24, the binarization circuit 25, etc., on the subsequent stage based on the RF signal passing though the third operational amplifier 10 and the capacitor 17. If the photoelectric conversion signals B to D are generated only due to the GND-line fluctuation X and if the first input voltage applied to the inverting input terminal=the second input voltage applied to the noninverting input terminal, the integrated circuit for optical disc 1 can prevent the effect of the GND-line fluctuation.

Although the integrated circuit for optical disc 1 at least alleviates the effect of the GND-line fluctuation X on the RF signal since the photodiode 2 is connected to the GND line, this is not a limitation. For example, if the integrated circuit for optical disc 1 has a circuit configuration shown in FIG. 4, the integrated circuit for optical disc 1 can at least alleviate the effect of a Vcc-line (one power supply line) fluctuation Y on the RF signal.

Specifically, the photodiode 2 is connected to the Vcc line at the cathode and is connected to the inverting input terminal of the first operational amplifier 3 at the anode. The parasitic capacitor 13 is connected in parallel with the photodiode 2 between the Vcc line and the inverting input terminal of the first operational amplifier 3. The capacitor 5 is connected between the Vcc line connected with the photodiode 2 and the parasitic capacitor 13 and the noninverting input terminal of the first operational amplifier 3.

In this case, if the capacitor 17 is charged in accordance with the alternating-current component of the RF signal, the current ia is supplied to the capacitor 18 and the Vcc line is fluctuated. Alternately (additionally), if the capacitor 16 is charged in accordance with the alternating-current component of the photoelectric conversion signal A, the current ib is supplied to the inductor 18 and the Vcc line is fluctuated. The Vcc line is also fluctuated due to external factors such as overlapping of noise components. The alternating-current component of the Vcc-line fluctuation Y is supplied to the feedback resistor 4 through the parasitic capacitor 13 of each of the light-receiving surfaces A to D. Therefore, the inverting input terminal of the first operational amplifier 3 receives the application of the first input voltage determined by a product of the alternating-current component of the Vcc-line fluctuation Y and a resistance value of the feedback resistor 4.

The alternating-current component of the Vcc-line fluctuation Y is supplied to the noninverting input terminal of the input resistor 6 through the capacitor 5 that is connected to the Vcc line along with the photodiode 2 and the parasitic capacitor 13 and has substantially the same capacitance as that of the parasitic capacitor 13. Therefore, the noninverting input terminal of the first operational amplifier 3 receives the application of the second input voltage determined by a product of the alternating-current component of the Vcc-line fluctuation Y and a resistance value of the input resistor 6. That is, the first input voltage and the second input voltage of substantially the same level are applied to the inverting input terminal and the noninverting input terminal of the first operational amplifier 3.

As a result, in the first operational amplifier 3, the first input voltage applied to the inverting input terminal is at least alleviated by the second input voltage applied to the noninverting input terminal. Therefore, as shown in FIG. 3, with regard to the photoelectric conversion signals B to D that should not be generated in a normal situation, the waveforms are changed from waveforms shown by dash lines (waveforms of the photoelectric conversion signals B to D generated in an integrated circuit for optical disc 101) to waveforms having lower levels shown by solid lines. As a result, if the photoelectric conversion signal A and the photoelectric conversion signals B to D are added by the adder 9 to generate the RF signal, the canceled amount of the photoelectric conversion signal A is reduced as compared to that in the conventional case since the levels of the photoelectric conversion signals B to D are lowered in the frequency band f where the phase of the photoelectric conversion signal A becomes the reversed phase of the photoelectric conversion signals B to D. That is, the effect of the Vcc-line fluctuation Y is at least alleviated in the RF signal. Therefore, the adder 9 outputs the RF signal closer (or identical) to the ideal RF signal shown in FIG. 7A. Information is more favorably reproduced as compared to that in the conventional case by performing a reproduction process in the calculation processing circuit 24, the binarization circuit 25, etc., on the subsequent stage based on the RF signal passing though the third operational amplifier 10 and the capacitor 17.

Although the resistant value of the input resistor 6 is substantially the same as the resistant value of the feedback resistor 4 and the capacitance of the capacitor 5 is substantially the same as the capacitance of the parasitic capacitor 13 in the above description, this is not a limitation. As long as (resistance value of the input resistor 6/resistance value of the feedback resistor 4)=(capacitance of the parasitic capacitor 13/capacitance of the capacitor 5) is satisfied, for example, the resistant value of the input resistor 6 may be ½ of the resistant value of the feedback resistor 4 and the capacitance of the capacitor 5 may be a twice of the capacitance of the parasitic capacitor 13. In this case, the alternating-current component of the GND-line fluctuation X supplied though the capacitor 5 is about a twice of the alternating-current component of the GND-line fluctuation X supplied though the parasitic capacitor 13 due to the capacitances thereof. Since the resistant value of the input resistor 6 is ½ of the resistant value of the feedback resistor 4, the first input voltage applied to the inverting input terminal of the first operational amplifier 3 has substantially the same level as the second input voltage applied to the noninverting input terminal. As a result, in the first operational amplifier 3, the first input voltage applied to the inverting input terminal is at least alleviated by the second input voltage applied to the noninverting input terminal, and the effect of the GND-line fluctuation X can at least be alleviated in the RF signal.

According to the above description, by including the photodiode 2, the capacitor 5 connected to the GND line (or Vcc line; the same applies to the following description), and the input resistor 6 and by determining the capacitance of the capacitor 5 and the resistance value of the input resistor 6 in accordance with the capacitance of the parasitic capacitor 13 and the resistance value of the feedback resistor 4, the GND-line fluctuation through the parasitic capacitor 13 can at least be alleviated by the GND-line fluctuation through the capacitor 5. As a result, the effect of the GND-line fluctuation can at least be alleviated in the RF signal, and the RF signal can be output which can cause the calculation processing circuit 24, the binarization circuit 25, etc., on the subsequent stage to perform favorable reproduction of information.

In accordance with a ratio of the resistance value of the input resistor 6 and the resistance value of the feedback resistor 4, the capacitance of the capacitor 5 can be determined relative to the capacitance of the parasitic capacitor 13. As a result, the photoelectric conversion signals B to D can be formed with waveforms indicated by "capacitance of the capacitor 5=capacitance of the parasitic capacitor 13" of FIG. 3, which has the largest level difference with the conventional case in the frequency band f where the photoelectric conversion signal A and the photoelectric conversion signals B to D have reversed phases. Therefore, the effect of the GND-line fluctuation can be alleviated in the RF signal to a maximum extent.

When the capacitor 17 (16) is discharged, the effect of the GND-line fluctuation can at least be alleviated which is generated by the current ic (id) supplied to the GND line and the inductor 19.

Although the capacitance of the capacitor 5 is substantially the same as the capacitance of the parasitic capacitor 13 when the resistant value of the input resistor 6 is substantially the same as the resistant value of the feedback resistor 4 in the above description, this is not a limitation. For example, the capacitance of the capacitor 5 can be greater than the capacitance of the parasitic capacitor 13. "Capacitance of the capacitor 5>capacitance of the parasitic capacitor 13" shown in FIG. 3 indicates the photoelectric conversion signals B to D when the capacitance of the capacitor 5 is set greater than the capacitance of the parasitic capacitor 13 by a predetermined capacitance. As shown in FIG. 3, in the case of "capacitance of the capacitor 5>capacitance of the parasitic capacitor 13", the photoelectric conversion signals B to D are lower in level than those in the conventional case. Therefore, the effect of the GND-line fluctuation X can be at least alleviated in the RF signal.

In the frequency band f where the photoelectric conversion signal A and the photoelectric conversion signals B to D have reversed phases, the photoelectric conversion signals B to D in the case of "capacitance of the capacitor 5>capacitance of the parasitic capacitor 13" have levels higher than those of the photoelectric conversion signals B to D in the case of "capacitance of the capacitor 5=capacitance of the parasitic capacitor 13". However, in a frequency band where the RF signal is generated (frequency band with the flat photoelectric conversion signal A), if the photoelectric conversion signals B to D have lower levels in the case of "capacitance of the capacitor 5>capacitance of the parasitic capacitor 13" than the case of "capacitance of the capacitor 5=capacitance of the parasitic capacitor 13" in the frequency band f where the photoelectric conversion signal A and the photoelectric conversion signals B to D have reversed phases, the effect of the GND-line fluctuation X can further be alleviated in the RF signal by setting "capacitance of the capacitor 5>capacitance of the parasitic capacitor 13".

Although the reference voltage Vref of the reference power source 14 is a predetermined value and the capacitance of the capacitor 5 is set to be equal to the capacitance of the parasitic capacitor 13 corresponding to the predetermined value, this is not a limitation. A value of the reference voltage Vref of the reference power source 14 may be variable such that a user using the integrated circuit for optical disc 1 can set a desirable value. For example, if the reference voltage Vref is a voltage obtained by dividing a power supply voltage of the calculation processing circuit 24, etc., on the subsequent stage, the power supply voltage is varied in accordance with specifications and the reference voltage Vref is also varied. In the first operational amplifier 3, as the voltage corresponding to the reference voltage Vref applied to the noninverting input terminal is reduced, the output voltage based on the voltage applied to the inverting input terminal is increased. Therefore, for example, if the voltage applied to the inverting input terminal is reduced to increase the output voltage of the first operational amplifier 3 for the purpose of alleviating (or preventing) noise components, etc., the reference voltage Vref may be set to be small. The capacitance of the parasitic capacitor 13 is varied in accordance with the value of the reference voltage Vref. Therefore, the capacitance of the capacitor 5 can be set taking into consideration that the value of the reference voltage Vref is variable.

Specifically, in the above description, the effect of the GND-line fluctuation X is alleviated in the RF signal by setting the reference voltage Vref to a predetermined value to achieve "capacitance of the capacitor 5=capacitance of the parasitic capacitor 13 (when the reference voltage Vref is a predetermined value)". However, for example, if the reference voltage Vref is set smaller than the predetermined value by a user, since the capacitance of the parasitic capacitor 13 becomes greater than the capacitance of the capacitor 5, the levels of the photoelectric conversion signals B to D may not be reduced to the desired levels. Therefore, there is preliminarily detected (or calculated) a range of the capacitance of the parasitic capacitor 13 varying in accordance with variations in the value of the reference voltage Vref. The capacitance of the capacitor 5 is set to capacitance equal to a substantially intermediate value of the capacitance of the parasitic capacitor 13. For example, if the reference voltage Vref is varied from the minimum value to the maximum value in the variable range by setting the capacitance of the capacitor 5 in this way, a difference between the capacitance of the parasitic capacitor 13 corresponding to the maximum value of the reference voltage Vref and the capacitance of the capacitor 5 can be set smaller than that in the above case. That is, the effect on the levels of the photoelectric conversion signals B to D can be reduced which is due to the variation in the capacitance of the parasitic capacitor 13 associated with the variation in the value of the reference voltage Vref. As a result, if the capacitance of the parasitic capacitor 13 is varied, the effect of the GND-line fluctuation X can further be alleviated in the RF signal.

Although the capacitance of the capacitor 5 is substantially the same as or more than the capacitance of the parasitic capacitor 13 when the resistance value of the input resistor 6 is substantially the same as the resistance value of the feedback resistor 4, this is not a limitation. That is, when the resistance value of the input resistor 6 is substantially the same as the resistance value of the feedback resistor 4, the capacitance of the capacitor 5 may be less than the capacitance of the parasitic capacitor 13. For example, when the resistance value of the input resistor 6 is substantially the same as the resistance value of the feedback resistor 4, the capacitance of the capacitor 5 is set to ½ of the capacitance of the parasitic capacitor 13. In this case, even if the levels of the photoelectric conversion signals B to D shown in FIG. 3 may not be achieved, the levels of the photoelectric conversion signals B to D can at least be lower than the conventional level in accordance with the capacitance of the capacitor 5, and the effect of the GND-line fluctuation X can at least be alleviated in the RF signal.

The above embodiments of the present invention are simply for facilitating the understanding of the present invention and are not in any way to be construed as limiting the present invention. The present invention may variously be changed or altered without departing from its spirit and encompass equivalents thereof.

It is claimed:

1. An integrated circuit for optical disc, outputting an RF (Radio Frequency) signal for reproducing information recorded on an optical disc, based on reflected light of a laser beam applied to the optical disc, the reflected light being received by a plurality of light-receiving surfaces of a photodetector, the integrated circuit comprising, between a first power supply line and a second power supply line whose voltage is lower than that of the first power supply line, for each of the plurality of light-receiving surfaces:

an operational amplifier including a positive power supply terminal connected to the first power supply line, a negative power supply terminal connected to the second power supply line, an inverting input terminal for receiving application of a first input voltage, a noninverting input terminal for receiving application of a second input voltage, and an output terminal for outputting an output voltage;

a feedback resistor connected between the inverting input terminal and the output terminal;

an input resistor connected between the noninverting input terminal and a reference power source providing a variable reference voltage value, a resistance value of the input resistor equal to a resistance value of the feedback resistor, a photodiode connected between one power supply line of the first power supply line and the second power supply line and the inverting input terminal, the photodiode to generate a current corresponding to the reflected light of the laser beam, the photodiode having a first parasitic capacitance that varies in accordance with variations in the reference voltage;

a capacitor connected between the one power supply line and the noninverting input terminal; and the integrated circuit further comprising:

an adder adding voltages corresponding to the output voltages of the operational amplifiers of the respective light-receiving surfaces, to generate the RF signal, wherein a capacitance of the capacitor is an intermediate capacitance in a range of the first parasitic capacitance of the photodiode varying in accordance with variations in the reference voltage so as to at least alleviate an effect of fluctuations of the one power supply line on the RF signal.

2. The integrated circuit for optical disc of claim 1, wherein:

the one power supply line includes an inductor component, a second parasitic capacitor exists between a signal line for transmitting the RF signal and a ground, and fluctuations of the one power supply line are generated by a current flowing through the inductor component when the second parasitic capacitor between the signal line and ground is charged or discharged.

* * * * *